United States Patent
Wang

(10) Patent No.: US 9,256,767 B2
(45) Date of Patent: Feb. 9, 2016

(54) TRACKING SYSTEM

(75) Inventor: Ynjiun P. Wang, Cupertino, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 12/616,325

(22) Filed: Nov. 11, 2009

(65) Prior Publication Data

US 2011/0108616 A1 May 12, 2011

(51) Int. Cl.
| | |
|---|---|
| *G06F 17/00* | (2006.01) |
| *G06K 7/00* | (2006.01) |
| *G06K 19/08* | (2006.01) |
| *G06Q 10/00* | (2012.01) |

(52) U.S. Cl.
CPC .............. *G06K 7/0004* (2013.01); *G06K 19/08* (2013.01); *G06Q 10/00* (2013.01)

(58) Field of Classification Search
USPC ........................................................ 235/375
See application file for complete search history.

(56) References Cited

U.S. PATENT DOCUMENTS

| | | | |
|---|---|---|---|
| 5,566,441 A * | 10/1996 | Marsh et al. ..................... 29/600 |
| 6,147,604 A * | 11/2000 | Wiklof et al. .............. 340/572.1 |
| 6,264,106 B1 | 7/2001 | Bridgelall |
| 6,371,375 B1 | 4/2002 | Ackley et al. |
| 6,557,758 B1 | 5/2003 | Monico |
| 6,714,120 B2 * | 3/2004 | Blama et al. ................. 340/10.1 |
| 7,114,654 B2 * | 10/2006 | Chapman et al. ........ 235/462.01 |
| 7,207,488 B2 | 4/2007 | Hammerslag et al. |
| 7,223,802 B2 | 5/2007 | Aoki et al. |
| 7,239,226 B2 | 7/2007 | Berardi et al. |
| 7,416,121 B2 | 8/2008 | Zimmerman |
| 7,553,545 B2 | 6/2009 | Kunze et al. |
| 2002/0054940 A1 * | 5/2002 | Grose et al. .................... 426/231 |
| 2003/0036425 A1 * | 2/2003 | Kaminkow et al. ............. 463/25 |
| 2004/0124982 A1 | 7/2004 | Kovach |
| 2007/0126556 A1 | 6/2007 | Subramanian et al. |
| 2007/0158436 A1 | 7/2007 | Ichikawa |
| 2007/0188306 A1 * | 8/2007 | Tethrake et al. ........... 340/10.51 |
| 2007/0255502 A1 | 11/2007 | Pruett et al. |
| 2008/0272886 A1 | 11/2008 | Tiller et al. |
| 2009/0091452 A1 * | 4/2009 | Himmel ..................... 340/572.1 |
| 2010/0294840 A1 * | 11/2010 | Barry ....................... 235/462.01 |

FOREIGN PATENT DOCUMENTS

| | | |
|---|---|---|
| CN | 1886072 A | 12/2006 |
| CN | 1977281 A | 6/2007 |

(Continued)

OTHER PUBLICATIONS

Jul. 24, 2014 Office Action issued in Chinese Patent Application No. 201010610699.5 (with translation).

(Continued)

*Primary Examiner* — Rafferty Kelly
(74) *Attorney, Agent, or Firm* — Oliff PLC; R. Brian Drozd

(57) ABSTRACT

An exemplary tracking device or system includes: a radio frequency identification (RFID) circuit disposed on a substrate; an encapsulation cap encapsulating the RFID circuit and substrate; and, an information bearing indicia (IBI) disposed on the encapsulation cap, the RFID circuit and IBI providing at least some similar information when read with a respective reading device.

22 Claims, 4 Drawing Sheets

(56) References Cited

FOREIGN PATENT DOCUMENTS

| | | |
|---|---|---|
| EP | 0911755 A1 | 4/1999 |
| WO | WO 2005/057238 A2 | 6/2005 |
| WO | WO2008-098392 A1 | 8/2008 |
| WO | WO 2008098392 | 8/2008 |

OTHER PUBLICATIONS

Dec. 31, 2014 Office Action issued in Chinese Application No. 201010610699.5.

Feb. 18, 2013 Communication pursuant to Article 94(3) EPC in European 10188720.6.

* cited by examiner

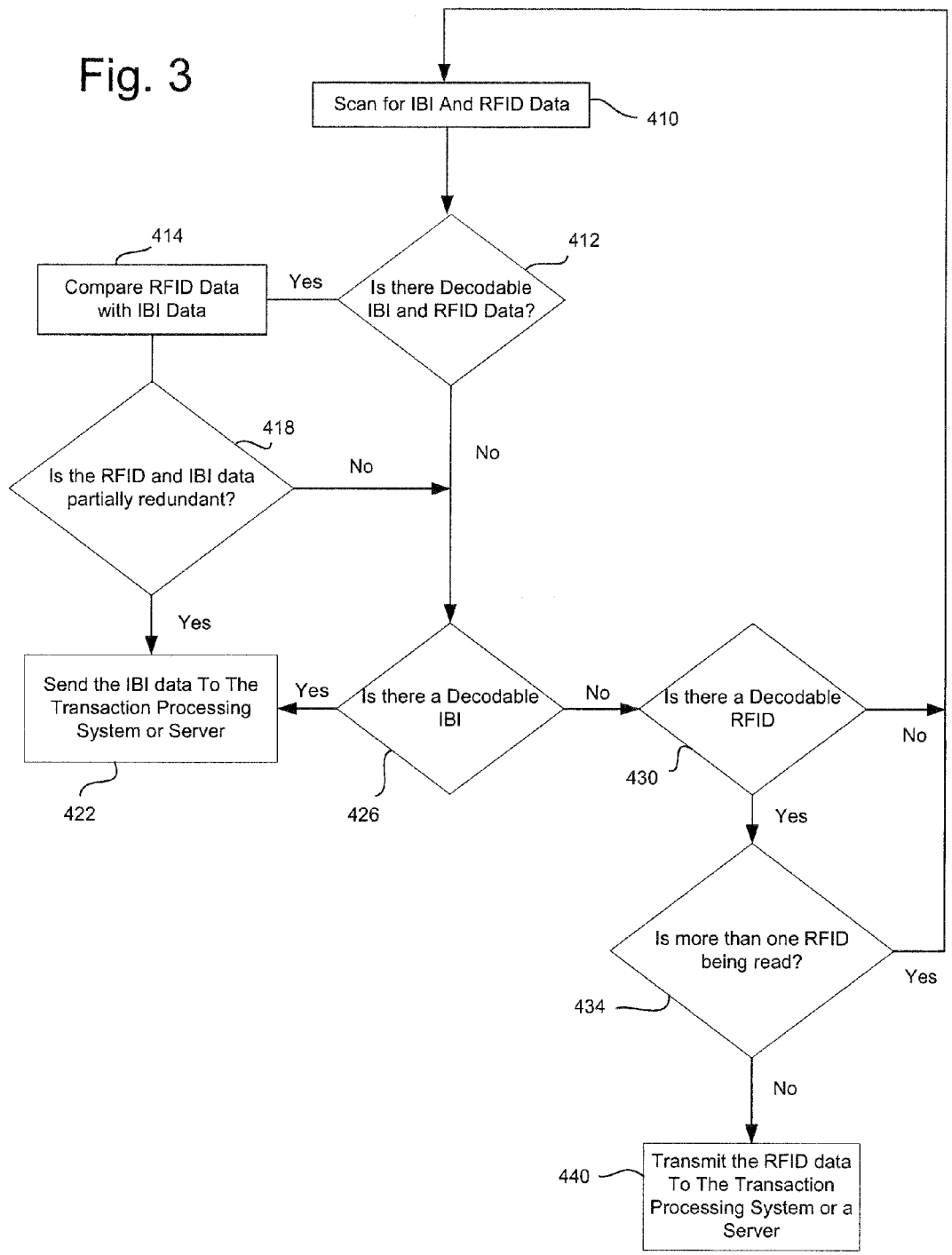

TRACKING SYSTEM

FIELD OF THE INVENTION

The present invention relates to tracking systems, and more particularly to a tracking system with RFID and bar code redundancy.

BACKGROUND

Indicia reading devices (also referred to as scanners, image reader, indicia readers, bar code readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the reader is communicated to a host computer situated on a hardwired backbone via a wireless link. For example, the readers may include a radio or optical transceiver for communicating with a remote computer.

Some data collection or reading devices, such as hand-held indicia readers, mobile devices, such as a portable data terminals (PDT), personal digital assistants (PDA), mobile phones, etc., are capable of capturing images as well as reading barcodes. The reading and decoding of an IBI represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

BRIEF DESCRIPTION OF THE DRAWINGS

FIG. 3 is an exemplary flow chart for operating a tracking system.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia or machine-readable medium. The term imaging used herein refers to the taking or creation of an electronic image.

A machine-readable medium (automated data medium) is a medium capable of storing data in a machine-readable format that can be accessed by an automated sensing device and capable of being turned into some form of digital data. Examples of machine-readable media include symbologies, barcodes, RFID, etc. Any information retrievable by any form of energy can be machine-readable.

A human-readable medium or human-readable format is a representation of data or information that can be naturally read by humans.

Figure 1:
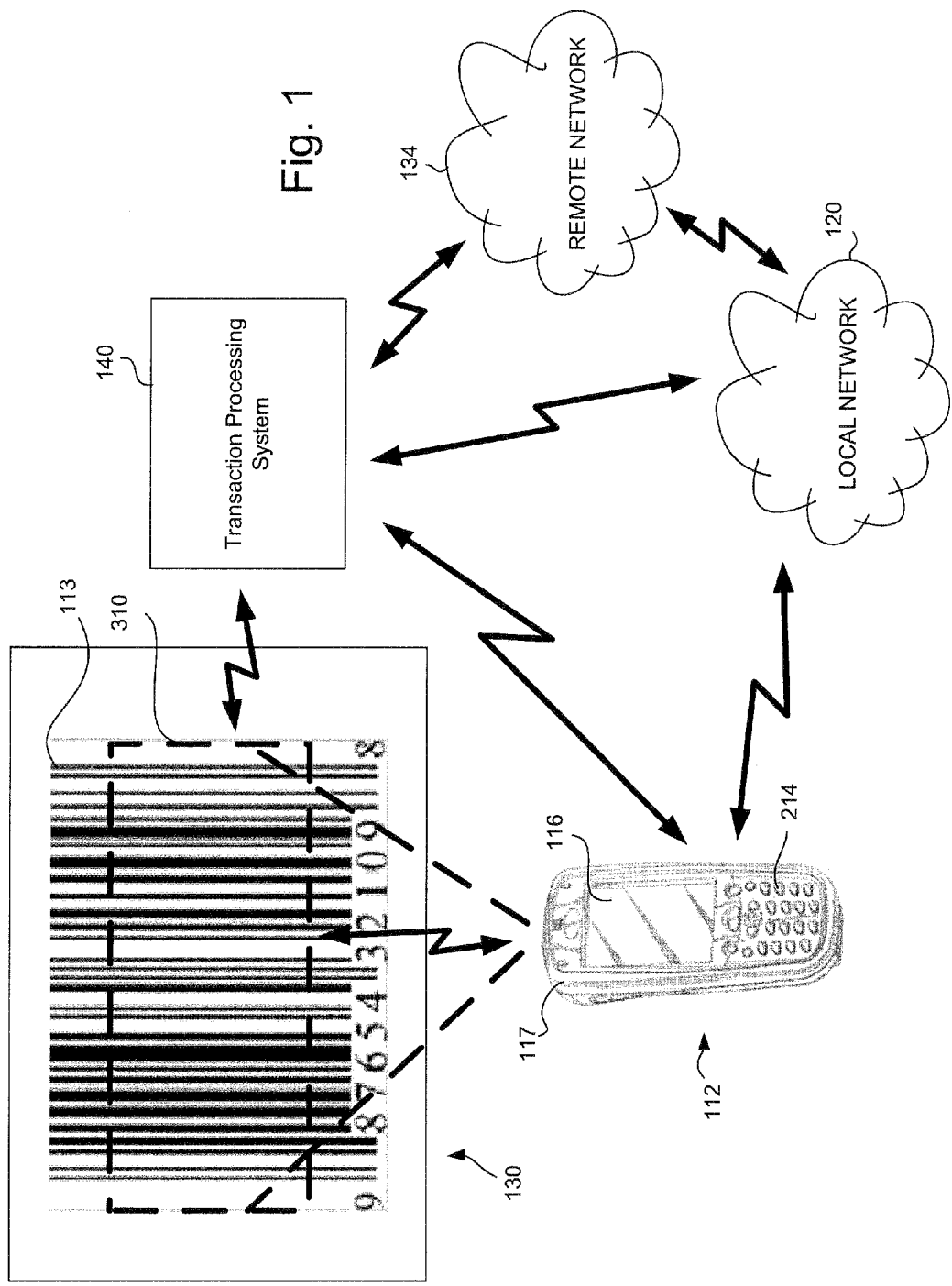
FIG. 1 is a block diagram of an exemplary tracking system.
Figure 2:
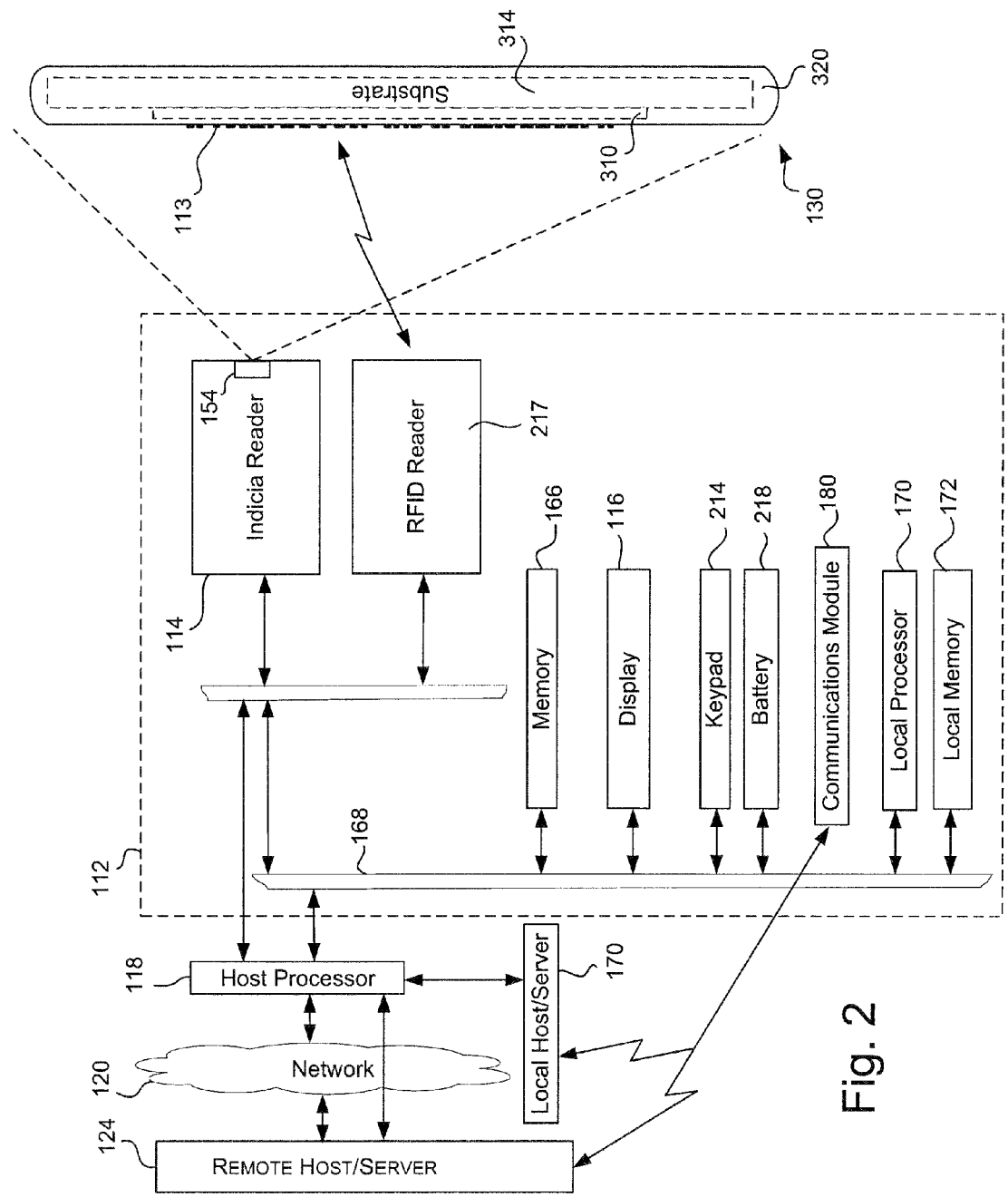
FIG. 2 is a block schematic diagram of an exemplary tracking system.

FIGS. 1 and 2 illustrates an exemplary tracking system configuration, wherein a machine readable medium (MRM) 130 is scanned by a reading device 112, such as hand held scanner or mobile device 112 operated or utilized to extract data from the MRM.

An exemplary MRM tracking device or tag is comprised of a RFID transponder 310 disposed on a substrate 314. Exemplary substrate materials are a metal foil such as a steel metal sheet with 0.1 mm thick or other materials such as plastic, or paper, etc. The RFID transponder 310 and substrate 314 may be encapsulated or sealed with a sealing material 320. An IBI 113 or dataform may be disposed or printed on the encapsulation material. Exemplary encapsulation materials may include (though are not limited to): thermoplastics thermosetting polymers, plastic films or foils, release liner, textiles, fabrics, plastic containers, any variety of paper (lightweight, heavyweight, coated, uncoated, paperboard, cardboard, etc.), or parchment.

An IBI or dataform may be a machine generated symbology that is machine readable, such as a 1-D barcode, a 2-D barcode, a 1-D stacked barcode, a logo, glyphs, color-codes, and the like. An exemplary IBI, such as a UPC code may also be read by a human without using a mobile device indicia reader.

An exemplary MRM tracking device comprises a radio frequency identification (RFID) circuit disposed on a substrate, an encapsulation cap encapsulating the RFID circuit and substrate; and, an information bearing indicia (IBI) disposed on the substrate, wherein the RFID circuit and IBI provide at least some similar information when read with a respective reading device.

An exemplary reading device is a mobile device having a RFID reader 217 disposed in a housing 117 for obtaining information from the RFID instrument (transponder, tag, label etc.). RFID is a technology similar in theory to symbology identification wherein electromagnetic or electrostatic coupling in the RF portion of the electromagnetic spectrum is used to transmit signals. RFID systems may be used where a unique identification system is needed. Information stored in a RFID transponder may be the same or similar to the information provided in the IBI. A RFID system consists of an antenna and a transceiver, which read a radio frequency and transfer information or data to a processing device, and a transponder, or tag, which is an integrated circuit containing the RF circuitry and information to be transmitted. If operating correctly, RFID systems eliminate the need for line-of-sight reading that bar coding depends on. RFID scanning may be done at greater distances than bar code scanning. Ultra High frequency RFID systems (850 MHz to 950 MHz and 2.4 GHz to 2.5 GHz) may offer transmission ranges of more than 90 feet. On the other hand the High frequency RFID systems (13.56 MHz) offer smaller footprints in antenna for both tag and reader with closer read range.

RFID asset tracking technology facilitates moving or transporting a RFID transponder into proximity with a RFID reader or moving a RFID reader into proximity with a RFID transponder. Traveling from one location to the next, an audit of assets and inventory items spread across numerous places, buildings, floors, rooms, etc. is attainable quickly.

An exemplary low cost printed RFID transponder embedded into the MRM 130 may be a printed silicon RFID circuit, such as is described in U.S. Pat. No. 7,553,545 entitled COMPOSITIONS AND METHODS FOR FORMING A SEMICONDUCTING AND/OR SILICON-CONTAINING FILM, AND STRUCTURES FORMED THEREFROM and United States Patent Application 20070126556 entitled PRINTED RADIO FREQUENCY IDENTIFICATION (RFID) TAG USING TAGS-TALK-FIRST (TTF) PROTOCOL, both assigned to Kovio, Inc., and are hereby incorporated herein by reference. Exemplary printed silicon high frequency (HF) RFID chips encodes at least 128-Bit information with 13.56 MHz HF band. Exemplary printing techniques are offset lithography; flexography; gravure; screen printing; ink jet; and nanoimprinting.

An exemplary method for reading such hybrid MRMs (IBI and RFID) is having the indicia reader 114 capture the IBI to decode the IBI on the MRM and the integrated RFID reader 217 read the tag at the same time or before or later. Whichever reader succeeds will report the result. If both read, the IBI decode result may be compared with RFID read result to confirm the decode correctness.

In an exemplary embodiment, if a RFID reader reads more than one RFID transponder brought within reading range then the IBI decode result will take precedence if the RFID result is conflicting with IBI result. To resolve the multiple RFID reads from all RFID tags within, a multi-resolution parity check scheme on the IBI may be implemented.

When using an embodiment of a mobile device, a human operator may intuitively point the indicia reader directly at the data to be collected, regardless of its type, and actuate a trigger. A human operator may aim a hand-held mobile device having an indicia reader at a target having an information bearing indicia (IBI) 113 or dataform, text, or other element and actuate a trigger to extract data from the IBI.

An exemplary reading device 112 may be a portable data terminal (PDT), personal digital assistant (PDA), hand held scanner, mobile phone, etc., such as a Honeywell 4600r or Honeywell 9600. The reading device may have a display 116. The device may serve as an indicia reader and a RFID reader for use in a store, warehouse, hospital, on a farm or in the field to acquire data. The reading device may access a database from a remote location. A Portable Data Terminal, or PDT, is typically an electronic device that is used to enter or retrieve data via wireless transmission (WLAN or WWAN). Personal Digital Assistants (PDAs) are handheld devices typically used as a personal organizer and may have many uses such as calculating, inventory tracking, accessing the internet, sending and receiving data, e-mails, note taking, use as an address book, use as a spreadsheet, etc.

An exemplary reading device has an image sensor 154 which digitizes a representative image seen in an imaging field of view. The reading device may be in communication (wired or wireless) to a remote or local transaction processing system 140. The transaction processing system 140 may be at a point of transaction (POT) or sale and may be in communication (wired or wireless) with a local server 122. The local server 122 may be in communication with network 120 and or a remote/web server 134.

An exemplary reading device may have an indicia reader 114 which utilizes an image sensor 154 to provide a digitized image of a tag 130, target, label, package etc. Digitizing or digitization may be representing an object, an image, or a signal (usually an analog signal) by a discrete set of its points or samples. The result is digital data called a "digital representation" or, more specifically, a "digital image" for the object and "digital form" for the signal.

The output of the image sensor may be processed utilizing one or more functions or algorithms to condition the signal appropriately for use in further processing downstream, including being digitized to provide a digitized image of target 130. Digitizing or digitization may be representing an object, an image, or a signal (usually an analog signal) by a discrete set of its points or samples. The result is digital data called a "digital representation" or, more specifically, a "digital image", for the object, and "digital form", for the signal.

In an exemplary embodiment the indicia reader may utilize a laser for reflecting laser light off the tag. This may be referred to laser scanning wherein the reflected laser light is converted into signals reflected off an IBI into IBI signals representative of the converted light. An aiming pattern generator may not be necessary in such an embodiment if the illumination laser provides an aiming function in addition to an illumination function.

The components in reading device 114 may be connected by one or more bus 168, data lines or other signal or data communication form. A local processor 170 may be utilized to perform a number of functional operation, which may involve the performance of a number of related steps, the particulars of which may be determined by or based upon certain configuration settings stored in memory 166. A host processor 118 external of the reading device may provide functionality similar to the local processor 170.

An exemplary function of a processor 118, 170 may be to decode or otherwise process MRMs provided on the tag. Decoding is a term used to describe the interpretation of a machine readable information contained in the IBI and/or the RFID circuit.

A communications module 180 provides a communication link from reading device 112 to other imaging readers or to other systems such as a local host/server or a remote host/server 124.

The local processor, memory and associated circuitry which performs or controls the exemplary MRM reading and decoding functions may be provided in the reading device or on associated circuit boards which are located within a housing 117.

A battery 218 may be used to provide power to the components of the reading device.

Figure 4A:
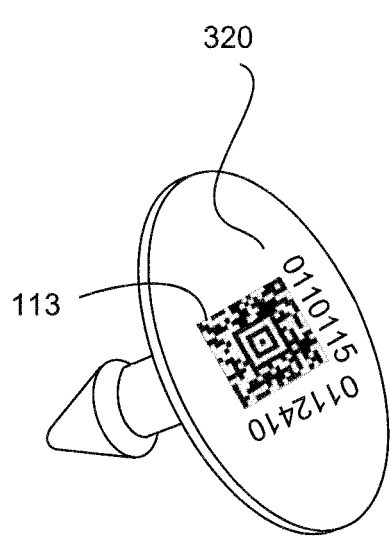
FIG. 4a-4c illustrate an exemplary tag for a tracking system.
Figure 4B:
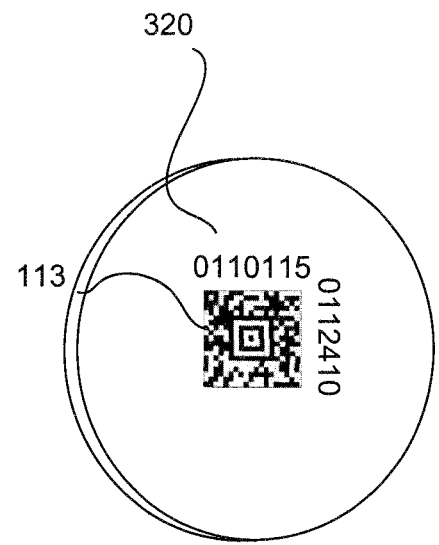
Figure 4C:
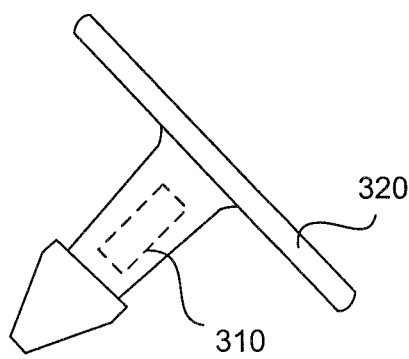

In an exemplary hybrid MRM tracking system, an animal ear tag as illustrated in FIGS. 4a-4c is printed with an IBI which may be subjected to aging and/or environmental damage which renders the MRM difficult to read, either by machine or human. Exemplary aging and environmental issues include: 1) the contrast of the code degrade over time under sunlight, moisture, rain, wind and dust conditions; 2) the plastic ear tag suffers wear-and-tear and/or even deformity or damaged due to the heat, animal tooth marks, etc.; or 3) the tag might be covered by dirt, water, etc. Embedding a RFID tag into an IBI tag provides a dual readable tag. Such redundancy enhances successful information capture, particularly in harsh environments.

An exemplary method for operating a tracking system is illustrated in FIG. 3, wherein a target is scanned for IBI and RFID data in a step 410. A query is made in a step 412 if there is both a decodable IBI and RFID in the scan. If yes, the RFID Data is compared with the IBI Data in a step 414. A query is made if there is at least a partial redundancy in the compared data in a step 418. If yes, then the IBI data is sent for further processing in a step 422. If there was not both IBI and RFID data in the query step 412, then a query is made in a step 426 whether there is decodable IBI data in the target. If yes, then the IBI data is sent for further processing in step 422. If there is no decodable IBI data in the target, then a query is made in a step 430 whether RFID data is read from the target. If no, then another target is scanned for IBI and RFID data in step 410. If the answer to query step 430 is yes, a query is made in a step 434 whether more than one RFID is being read. If yes, then another target is scanned for IBI and RFID data in step 410. If the answer to query step 434 is no, then the RFID data is sent for further processing in a step 440.

Exemplary processing in steps 422 and 440 may be comprised of many things, such as data interpretation, inventory monitoring and/or control, process monitoring and/or control, animal monitoring and/or control, sales monitoring and/or control, etc.

In exemplary tracking systems, one or all of the indicia reader, RFID reader, local processor, host processor, local host/server are mobile or stationary devices which may be disposed in the same or different housings.

What is described herein is an exemplary tracking device or system comprising: a radio frequency identification (RFID) circuit disposed on a substrate; an encapsulation cap encapsulating the RFID circuit and substrate; and, an information bearing indicia (IBI) disposed on the encapsulation cap, wherein the RFID circuit and IBI provide at least some similar information when read with a respective reading device. The RFID circuit may be printed using offset lithography; flexography; gravure; screen printing; ink jet; and nanoimprinting on the substrate, which may be comprised of a metal foil such as a steel metal sheet with 0.1 mm thick or other materials such as plastic, or paper, etc. The RFID circuit and IBI may provide at least partially redundant information. The RFID information may be compared with the IBI information.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The described embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of tracking information using a hand held reader, the method comprising:
   scanning for an information bearing indicia (IBI) and radio frequency identification (RFID) data;
   reading information from the RFID circuit and the IBI;
   comparing information read from the RFID circuit and the IBI;
   determining if the RFID circuit and IBI provide at least some redundant information when read with a respective reading device based on the comparison of information read from the RFID circuit and the IBI;
   wherein a decoded result of the IBI takes precedence over a decoded result of the RFID circuit in response to determining that information provided by the circuit is conflicting with information provided by the IBI, when the RFID circuit is being read along with at least one other RFID circuit.

2. The method of claim 1, further comprising determining if there is decodable RIFD data and IBI from the scanning.

3. The method of claim 2, wherein the comparing is performed in response to the determining that there is both decodable RIFD data and IBI from the scan.

4. The method of claim 1, wherein the hand held reader reads more than one RFID circuit brought within reading range and the IBI read result takes precedence if a RFID read result is conflicting with IBI read result.

5. The method of claim 4, wherein the hand held reader performs a multi-resolution parity check scheme on the IBI read.

6. The method of claim 1, wherein the substrate is adapted as an animal tag.

7. The method of claim 1, further comprising:
   disposing a radio frequency identification (RFID) circuit on a substrate;
   encapsulating the RFID circuit and substrate; and
   disposing an information bearing indicia (IBI) on an encapsulation cap.

8. The method of claim 1, further comprising determining if the IBI is decodable in response to determining that the RFID circuit and IBI do not provide at least some redundant information.

9. The method of claim 8, further comprising determining if there is the RFID is decodable in response to determining that the IBI is not decodable.

10. The method of claim 9, further comprising transmitting the RFID data to a transaction processing system in response to determining that the RFID is decodable but that the IBI is not decodable.

11. The method of claim 1, wherein the RFID circuit is printed on the substrate.

12. A hand held reader comprising:
   a scanner for scanning an information bearing indicia (IBI) and radio frequency identification (RFID) data;
   a radio frequency identification (RFID) circuit disposed on a substrate; and,
   an information bearing indicia (IBI),
   a processor configured to:
      read information from the RFID circuit and the IBI;
      comparing information read from the RFID circuit and the IBI; and
      determining if the RFID circuit and IBI provide at least some redundant information when read with a respective reading device based on the comparison of information read from the RFID circuit and the IBI;
      wherein a decoded result of the IBI takes precedence over a decoded result of the RFID circuit in response to determining that information provided by the RFID circuit is conflicting with information provided by the IBI, when the RFID circuit is being read along with at least one other RFID circuit.

13. The hand held reader in accordance with claim 12, wherein the RFID circuit is printed on the substrate.

14. The hand held reader in accordance with claim 13, further comprising a processor system adapted to compare the extracted RFID information with the IBI information.

15. The hand held reader in accordance with claim 13, wherein the IBI is printed on an encapsulation cap.

16. The hand held reader in accordance with claim 13, wherein the hand held reader reads the RFID circuit and IBI at the same time.

17. The hand held reader in accordance with claim 16, wherein the hand held reader reports a result of whichever RFID circuit and IBI read succeeds.

18. The hand held reader in accordance with claim 16, wherein the hand held reader compares the IBI and RFID circuit to confirm read correctness.

19. The hand held reader in accordance with claim 13, wherein the hand held reader reads more than one RFID circuit brought within reading range and the IBI read result will take precedence if a RFID read result is conflicting with IBI read result.

20. The hand held reader in accordance with claim 19, the hand held reader performs a multi-resolution parity check scheme on the IBI read.

21. The hand held reader in accordance with claim 13, wherein the hand held reader is adapted as an animal tag.

22. The hand held reader in accordance with claim 13, wherein the hand held reader is adapted as an animal ear tag.

* * * * *